US008103300B2

(12) United States Patent
Gogic

(10) Patent No.: US 8,103,300 B2
(45) Date of Patent: Jan. 24, 2012

(54) SYSTEM AND METHOD FOR FORMING AD-HOC LOCATION-BASED MULTICAST GROUP

(75) Inventor: Aleksandar Gogic, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 636 days.

(21) Appl. No.: 11/398,207

(22) Filed: Apr. 4, 2006

(65) Prior Publication Data

US 2007/0173273 A1 Jul. 26, 2007

Related U.S. Application Data

(60) Provisional application No. 60/668,440, filed on Apr. 4, 2005.

(51) Int. Cl.
*H04B 7/00* (2006.01)
(52) U.S. Cl. .... 455/519; 455/517; 455/41.2; 455/456.1; 455/509; 370/338
(58) Field of Classification Search .......... 455/518–519, 455/41.2, 456.1, 414.1; 709/204
See application file for complete search history.

(56) References Cited

U.S. PATENT DOCUMENTS

| 4,870,408 | A | * | 9/1989 | Zdunek et al. ............. 370/341 |
| 5,014,345 | A | * | 5/1991 | Comroe et al. ............. 455/519 |
| 5,235,631 | A | * | 8/1993 | Grube et al. ............... 455/509 |
| 5,493,286 | A | * | 2/1996 | Grube et al. ............... 340/7.25 |
| 5,752,196 | A | * | 5/1998 | Ahvenainen et al. ........ 455/518 |
| 5,924,041 | A | * | 7/1999 | Alperovich et al. ....... 455/456.1 |
| 6,005,848 | A | * | 12/1999 | Grube et al. ................. 370/266 |
| 6,028,866 | A | * | 2/2000 | Engel et al. ................. 370/461 |
| 6,119,017 | A | * | 9/2000 | Cassidy et al. .............. 455/518 |
| 6,169,906 | B1 | * | 1/2001 | Bruckert ..................... 455/518 |
| 6,252,952 | B1 | * | 6/2001 | Kung et al. ............... 379/114.1 |
| 6,256,503 | B1 | | 7/2001 | Stephens |
| 6,519,629 | B2 | * | 2/2003 | Harvey et al. .............. 709/204 |

(Continued)

FOREIGN PATENT DOCUMENTS

WO 2005029899 3/2005

OTHER PUBLICATIONS

International Search Report and Written Opinion—PCT/US2006/013001, International Search Authority—European Patent Office—Aug. 16, 2006.

*Primary Examiner* — Sharad Rampuria
(74) *Attorney, Agent, or Firm* — Sayed H. Beladi

(57) ABSTRACT

A system, method, and media for providing group communication services to an ad-hoc group formed according to vicinity with other users of communication devices in a communication system. Communicating among a communication group of a plurality of wireless communication devices in a communication system includes forming the communication group including transmitting an invitation including group membership location criteria to join the communication group to the plurality of wireless communication devices. The group membership location criteria is evaluated at each of the plurality of wireless communication devices receiving the invitation and the communication group is formed by ones of the plurality of wireless communication devices that meet the group membership location criteria. Permission to transmit to others of the plurality of wireless communication devices of the communication group is granted to one of the wireless communication devices of the communication group.

57 Claims, 7 Drawing Sheets

U.S. PATENT DOCUMENTS

| | | | |
|---|---|---|---|
| 6,542,750 B2* | 4/2003 | Hendrey et al. | 455/456.1 |
| 6,885,874 B2* | 4/2005 | Grube et al. | 455/520 |
| 6,898,423 B2* | 5/2005 | Motegi et al. | 455/414.2 |
| 6,975,873 B1* | 12/2005 | Banks et al. | 455/456.5 |
| 7,149,288 B2* | 12/2006 | Digate et al. | 379/88.17 |
| 7,170,863 B1* | 1/2007 | Denman et al. | 370/260 |
| 7,529,558 B1* | 5/2009 | Blair et al. | 455/519 |
| 2002/0090954 A1 | 7/2002 | Tanaka et al. | |
| 2003/0078064 A1 | 4/2003 | Chan | |
| 2003/0105820 A1* | 6/2003 | Haims et al. | 709/205 |
| 2003/0153342 A1* | 8/2003 | Crockett et al. | 455/519 |
| 2004/0082352 A1* | 4/2004 | Keating et al. | 455/519 |
| 2004/0098455 A1* | 5/2004 | Ellis et al. | 709/204 |
| 2005/0113123 A1* | 5/2005 | Torvinen | 455/519 |
| 2005/0153724 A1* | 7/2005 | Vij et al. | 455/518 |
| 2005/0233776 A1* | 10/2005 | Allen et al. | 455/567 |
| 2005/0239405 A1* | 10/2005 | Myyry et al. | 455/41.2 |
| 2007/0019616 A1* | 1/2007 | Rantapuska et al. | 370/352 |
| 2010/0069035 A1* | 3/2010 | Johnson | 455/404.1 |
| 2010/0246468 A1* | 9/2010 | Santhanam et al. | 370/312 |

* cited by examiner

SYSTEM AND METHOD FOR FORMING AD-HOC LOCATION-BASED MULTICAST GROUP

CLAIM OF PRIORITY UNDER 35 U.S.C. §119

The present Application for Patent claims priority to Provisional Application No. 60/668,440, entitled "Forming Push-to-Talk Groups based on Location of Users, and Granting Floor Remotely" filed Apr. 4, 2005, and assigned to the assignee hereof and hereby expressly incorporated by reference herein.

BACKGROUND

1. Field

The present invention relates to point to multi-point communications systems. More specifically, the present invention relates to a method and apparatus for forming an ad-hoc location-based multicast group.

2. Background

In emergency communication situations, such as those arising from natural or man-made disasters, it is critical to enable forms of communication that are efficient, so that maximum number of affected people can access limited resources, such as wireless telecommunication channels. At times of large-scale disasters (e.g. earthquake or hurricanes), communication resources can be subjected to an unusually high load. A class of wireless service intended for quick, efficient, one-to-one or one-to-many (group) communication has existed in various forms for many years. In general, these services have been half-duplex, where a user presses a "push-to-talk" (PTT) button on his phone/radio to initiate speech. Pushing the button either keys his radio, in some implementations, or in a moderated system, where communications occurs via a server of some type, indicates the user's request for the "floor." If granted the floor, or talker permission, the user then generally speaks for a few seconds, after which he releases his PTT button, and other speakers can request the floor. Communication is generally from one speaker to a group of listeners, but may be one-to-one. This service has traditionally been used in applications where one person, a "dispatcher," needs to communicate to a group of people, such as field service personnel or taxi drivers, which is where the "dispatch" name for the service comes from.

A key feature of these services is that communication is quick and spontaneous, usually initiated by simply pressing a PTT button, without going through a typical dialing and ringing sequence. Communication in this type of service is generally very short, with individual talk "spurts" being generally on the order of several seconds, and "conversations" lasting possibly a minute or less.

Since communications occur in "spurts" or abbreviated conversations, the conveyed information is generally to the point and results in an efficient communication methodology for emergency conditions where communication resources may be limited. Accordingly, communications that occur in "spurts" only require an occasional allocation of the communication resources to a specific user or group of users, making the resources available for use of others at different times. It is known that the use of communication "spurts" rather than dedicated channels results in a more efficient use of resources as many dedicated resource conversations includes substantial amounts of transmitted silence. Additionally, half duplex conversations do not tax resources of the portion of the conversation, either listening or speaking, that is not being utilized at the time.

As stated, communication may be configured to occur among group members. In a dispatch model, communication between endpoints takes place within virtual groups wherein the voice of one "talker" is broadcast or more specifically "multicast" to one or more "listeners". A single instance of this type of communication is commonly referred to as a dispatch call or simply a call. A call is an instantiation of a group, which defines the characteristics of the call and is, in essence, a member list with some associated information, such as a group name or group id. A member list is a list of one or more users that are invited to participate in the call.

There is a need for emergency response teams to establish communication with any and all users in an area affected by a large scale natural disaster, without straining available telecommunication resources excessively and for users in an area to be given emergency assistance information that is specific to the area where they are located.

SUMMARY

A system and method for providing group communication services to an ad-hoc group formed according to vicinity with other users of communication devices in a communication system. In one embodiment of the present invention, a method of communicating among a communication group of a plurality of wireless communication devices in a communication system includes forming the communication group including transmitting an invitation including group membership location criteria to join the communication group to the plurality of wireless communication devices. The group membership location criteria is evaluated at each of the plurality of wireless communication devices receiving the invitation and the communication group is formed by ones of the plurality of wireless communication devices that meet the group membership location criteria. Permission to transmit to others of the plurality of wireless communication devices of the communication group is granted to one of the wireless communication devices of the communication group.

In another embodiment of the present invention, a wireless communication device includes a method of communicating in a communication group of a plurality of wireless communication devices in a communication system. The wireless communication device joins the communication group in response to receiving an invitation to join the communication group to the plurality of wireless communication devices, the invitation including group membership location criteria. The wireless communication device evaluates the group membership location criteria and joins the communication group when inclusive to the criteria. The wireless communication device transmits to other ones of the plurality of wireless communication devices of the communication group upon receipt of permission to transmit in the communication system.

In a further embodiment of the present invention, a wireless communication system includes a communication manager including a dispatcher interface configured to generate an invitation to join a communication group with the invitation including group membership location criteria. The communication manager is further configured to grant to one of the group permission to transmit to others of the communication group. The wireless communication system further includes a base station configured to transmit the invitation to join the communication group and a plurality of wireless communication devices configured to evaluate the group membership location criteria at each of the plurality of wireless communication devices receiving the invitation. Ones of the plurality of wireless communication devices meeting the group membership location criteria are further configured to accept the invitation to join the communication group and one of the plurality of wireless communication devices is further configured to receive the permission to transmit and to transmit to others of the communication group in response thereto.

In yet another embodiment of the present invention, a communication device for communicating in a communication group of a plurality of wireless communication devices includes a means for joining the communication group, including a means for receiving an invitation to join the communication group to the plurality of wireless communication devices, the invitation including group membership location criteria, and a means for evaluating the group membership location criteria at each of the plurality of wireless communication devices receiving the invitation. The wireless communication device further includes a means for joining the communication group; and means for transmitting to other ones of the plurality of wireless communication devices of the communication group upon receipt of permission to transmit in a communication system to others of the plurality of wireless communication devices of the communication group.

In yet a further embodiment of the present invention, a computer readable media embodying a method of communicating among a communication group of a plurality of wireless communication devices in a communication system is provided. The method of communicating among a communication group of a plurality of wireless communication devices in a communication system includes forming the communication group including transmitting an invitation including group membership location criteria to join the communication group to the plurality of wireless communication devices. The group membership location criteria is evaluated at each of the plurality of wireless communication devices receiving the invitation and the communication group is formed by ones of the plurality of wireless communication devices that meet the group membership location criteria. Permission to transmit to others of the plurality of wireless communication devices of the communication group is granted to one of the wireless communication devices of the communication group.

In a yet further embodiment of the present invention, a computer readable media embodying a method of communicating in a communication group of a plurality of wireless communication devices in a communication system is provided. The method includes joining the communication group in response to receiving an invitation to join the communication group to the plurality of wireless communication devices, the invitation including group membership location criteria. The method further includes evaluating the group membership location criteria and joins the communication group when inclusive to the criteria and transmitting to other ones of the plurality of wireless communication devices of the communication group upon receipt of permission to transmit in the communication system.

DETAILED DESCRIPTION

Figure 1:
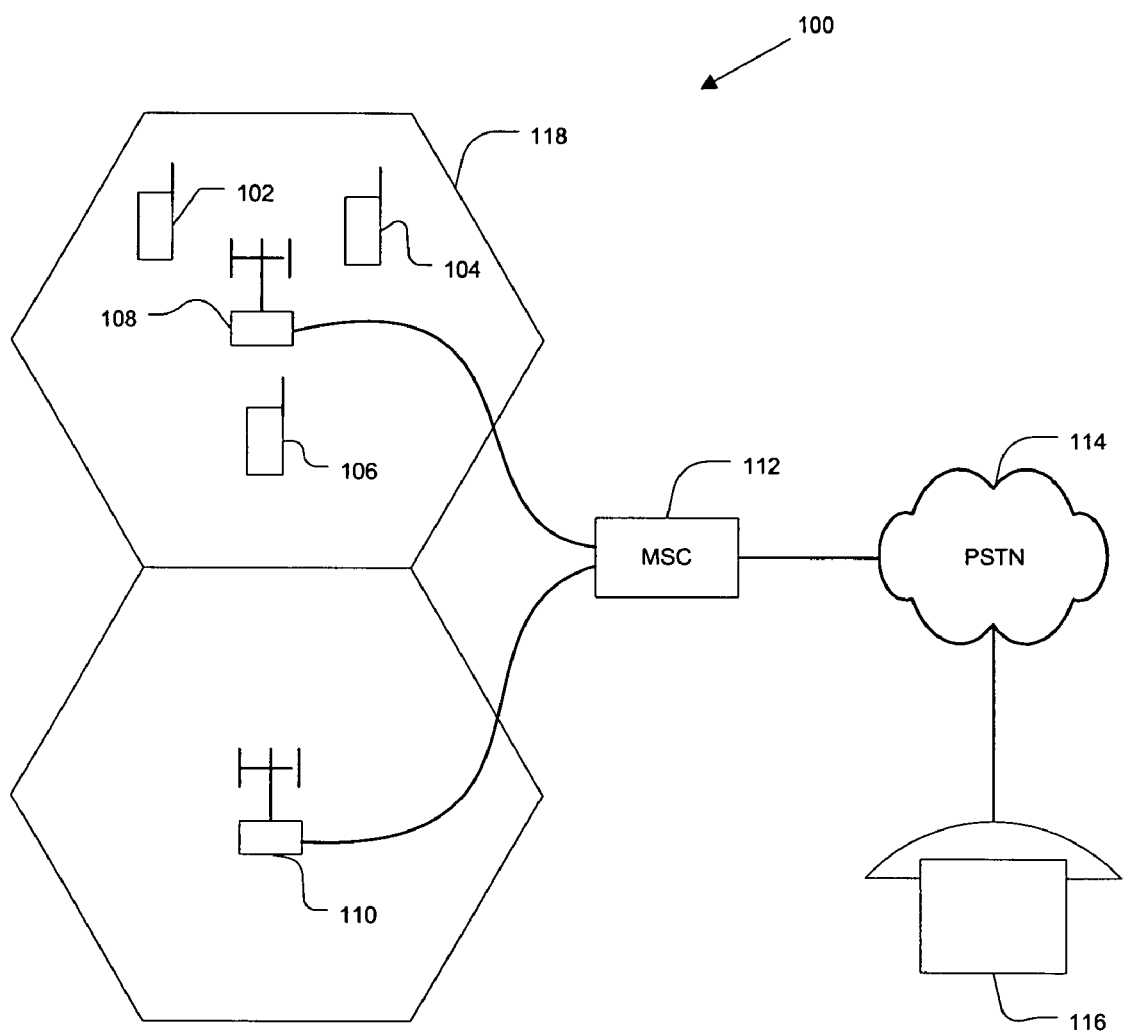
FIG. 1 illustrates a typical prior art wireless communication system 100.

The present invention is a system and method for providing group communication services to an ad-hoc group formed according to vicinity with other users of communication device(s) (CD), or according to proximity of a given locality, in an existing communication system. During emergency situations, the formation of a communication group based on proximity of other users, or based on user's location being confined to a given area, may allow emergency services to be more efficiently or more appropriately deployed. Generally, a collection of neighboring CDs is not subscribed into a specific communication group. The various embodiments of the present invention provide a method and system for the identification, grouping, and regulation of use of limited communication resources available to neighboring CDs.

An invitation to join the ad-hoc group is widely broadcast with criteria for membership. The invitation-recipient CDs determine if they are inclusive to the membership criteria. CDs that are inclusive to the membership criteria respond to the invitation with an acceptance of the invitation. In other embodiments of the present invention, the "floor" or permission to speak is managed by a dispatcher to manage voluminous requests to speak, prioritize speakers, assist disabled speakers, and release speakers that may become unable to relinquish the permission to speak.

Although the teachings of the present invention are described with respect to a wireless CDMA communication system, it should be understood that the present invention can be used with any wireless communication system including GSM systems, AMPS systems, TDMA systems, satellite communication systems, as well as other communications systems. In addition, the present invention is not limited to wireless communication systems. It can be used with wireline telephones, paging devices, portable or desktop computers, digital cameras, video cameras, etc. Furthermore, it should be understood that the present invention is applicable to both real-time data, such as audio and video data (including voice data) and time-independent data, such as computer files, email, and so on. Furthermore, the use of the term "speech," "talk," as used throughout is illustrative and contemplates all of the various forms of media including, but not limited to, voice, speech, data, video, as well as other signaling techniques.

A common form of group communications is known as "Push-To-Talk", commonly abbreviated as PTT. The characteristics of such a communication method includes conversing on half-duplex communication lines by pushing a button to allow voice communication to be transmitted and releasing the button to allow voice communication to be received. Such PTT features are being implemented in recent communication devices (CD) (e.g., mobile terminals, mobile phones, handsets, wireless devices, etc.), allowing a CD to function as a digital two-way radio (e.g., a walkie-talkie) in push-to-talk operation. One person at a time can talk by pressing a PTT button and one or several others can listen instantly. Certain PTT schemes are based on 2.5 G packet-switched networks (e.g., CDMA, GPRS, etc.) and use particular protocols, namely, SIP (Session Initiation Protocol) and RTP (Real Time Transport Protocol). These particular versions of PTT are called "Push-To-Talk over Cellular" (or Push-over-Cellular), commonly abbreviated as PoC.

As cellular communication networks are augmented to accommodate additional and various types of data (e.g., voice, images, audio, video, multimedia, etc.), various Internet access technologies are utilized. An example would be the Internet Protocol (IP), which is a data-oriented protocol used by source and destination hosts for communicating data across a packet-switched network (e.g., the Internet), and examples include IPv4, IPv6, and the like.

Among the numerous features of PTT (including a particular type of PTT called PoC), the floor control procedures related to a server is important for efficient group communications. In particular, the server can be considered as a centralized point that grants a "floor" to a PTT user who wishes to speak to a communication or talk group. Namely, a user can "take the floor" and speak to other users who can only listen during that time.

When multiple users wish to take the floor (in order to talk with other users) by respectively sending a transmission request (e.g., a floor request, a talk burst request, etc.), priorities should be allocated such that the users take turns in speaking by considering whether their transmission requests have been granted or denied. For example, the priorities may be allocated on a first come first served basis. For each transmission request from each client, the server may either grant or deny each request based upon the communications environment or other factors thereof. Talk burst allocation can also be referred to as obtaining the right to talk (or right to speak) or obtaining permission to transmit (access request). A user that is granted the right to talk is said to have been granted the "floor" or granted a "talk burst", and these expressions can be used interchangeably.

In the various embodiments of the present invention, master authority with which a talk burst can be managed is given to a particular user such as a dispatcher, and a server controls the talk burst according to a speaking management scheme that is applicable for situation or the particular time.

FIG. 1 is an illustration of a typical prior art wireless communication system 100 incapable of implementing the formation and control of ad-hoc group communications, otherwise known as point-to-multipoint communications, or push-to-talk communications. CDs 102, 104, and 106 represent three of a vast number of wireless telephones dispersed over a small geographic area 118 served by communication system 100. CDs 102, 104, and 106 transmit and receive communication signals from base stations 108 and/or 110, generally depending on their proximity to each base station. In a typical wireless communication system, there are many base stations in use to support the vast numbers of CDs active in communication system 100.

Figure 2:
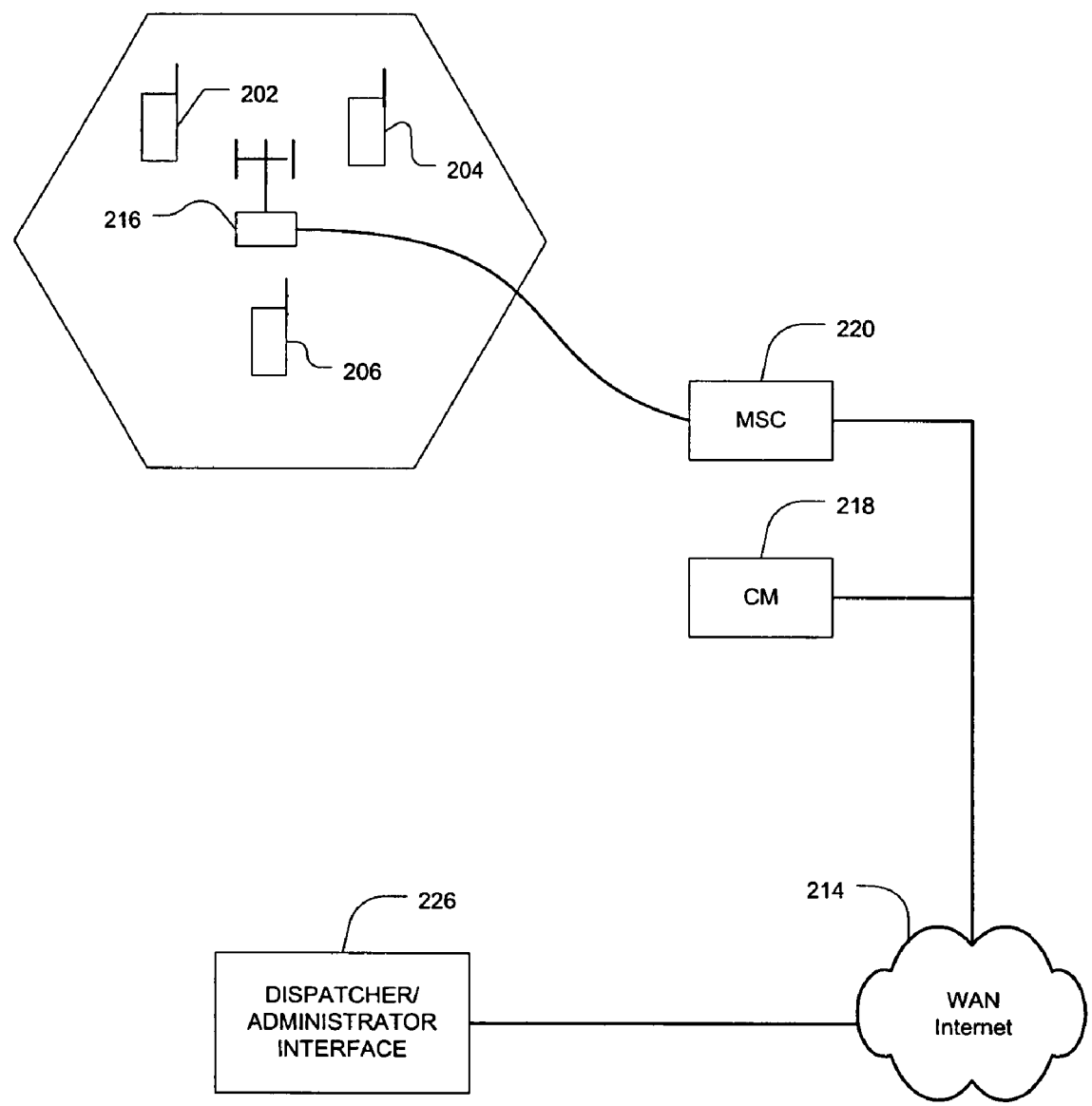
FIG. 2 illustrates a wireless communication system configured for group communication, in accordance with an embodiment of the present invention.

The present invention is illustrated in functional block diagram format in FIG. 2. Shown is group communication system 200, otherwise known as a push-to-talk system, a push-to-talk-over-cellular system (PoC), a group or net broadcast system, a dispatch system, or a point-to-multipoint communication system. A defining characteristic of such a communication system is that, generally, only one user may transmit information to other users at any given time. In group communication system 200, a group of communication device users, individually known as group or net members, communicate with one another using a wireless communication device (CD) assigned to each group or net member.

The term "group" or "net" denotes a collection of communication device users authorized to communicate with each other. Generally, a central database contains information identifying the members of each particular group. More than one group may operate in the same communication system. For instance, a first group may be defined having ten members and a second group may be defined, having 20 members. The ten members of the first group can communicate with each other, but generally not to members of the second group, although in principle an individual user may be a member of more than one group. In other situations, members of different groups are able to monitor communications between members of more than one group, but are only able to transmit information to members within their own group. In yet other situations, groups may not be pre-defined, but they can be formed in an ad-hoc fashion, typically by a user who invites other users to the ad-hoc group one at a time. Upon termination of the ad-hoc communication session, the group formed in this fashion is disbanded.

Group members communicate with each other using an assigned communication device, shown as communication devices (CD) 202, 204, and 206. In the present example, CDs 202, 204, and 206 are terrestrial wireless telephones. In other embodiments, the various CDs may comprise wireless video cameras, still cameras, audio devices such as music recorders or players, laptop or desktop computers, or paging devices. In another embodiment, at least one CD comprises a combination of the just-described embodiments. For example, CD 202 could comprise a wireless terrestrial telephone equipped with a video camera and display. Throughout the following discussion, reference to an individual CD may be expressed as CD 202. However, it should be understood that reference to CD 202 is not intended to limit the discussion to a terrestrial wireless telephone. In general, discussions pertaining to CD 202 will apply equally to other types of CDs as well.

Generally, CD may be a terrestrial wireless telephone capable of converting media, typically human speech, into data packets suitable for transmission over a data network. CD typically comprises an antenna, a display, keys, a speaker, an earpiece, and an optional push-to-talk (PTT) switch. The display and keys are herein collectively referred to as a user-interface. In an alternate embodiment, CD may use one of the existing keys as a push-to-talk switch when in a push-to-talk mode of communications instead of using a dedicated push-top-talk switch.

CD further includes conventional transmitters and receivers for compatibly interacting in the wireless communication system. CD may be configured to operate in one or more modes, or in a single mode of communication. By way of example and not limitation, one mode of operation includes a standard audio call mode from a CD to a base station. Such a mode is used to make typical point-to-point telephone calls using the given technology of the associated communication system. For example, the voice service mode for CD may refer to point-to-point audio communications using CDMA telecommunications standards promulgated by the Telecommunications Industry Association.

In the group communication system of FIG. 2, an exclusive transmission privilege is defined which generally allows only a single user to transmit information to other group members at any given time. The transmission privilege is granted or denied to requesting group members, depending on whether or not the transmission privilege is currently assigned to another group member when the request is received. The process of granting and denying transmission requests is known as arbitration. Another common nomenclature for such arbitration is also known as "requesting the floor", "granting the floor" and "denying the floor." Other arbitration schemes evaluate factors such as priority levels assigned to each CD in determining whether a requesting group member is granted the transmission privilege or "floor."

In order to participate in group communications, CDs 202, 204, and 206 are each equipped with a means for requesting the transmission privilege from a communication manager (CM) 218, as explained in greater detail below. CM 218 manages the real-time and administrative operation of groups, including PTT request arbitration (e.g., floor request/grant/deny), maintenance, and distribution of group membership and registration lists, call set-up and tear-down of necessary system and communication resources, as well as overall control of group or net status.

CM 218 maintains a list of defined groups and is designed to be managed remotely by either a communication system service provider, group members, or both, assuming that authorization is provided by the service provider. CM 218 may receive group definitions through an external administration interface 226. Group members may request administrative actions through their service provider or through requests to the administrator interface 226.

In one embodiment of the present invention, the administrator interface 226 accommodates a dispatcher for requesting the formation of an ad-hoc communication group of users located in a specific vicinity or region and for regulating communication over group communication system 200 based on various criteria. The dispatcher through administrator interface 226 may manage voluminous requests to speak, prioritize speakers, assist disabled speakers, and release speakers that may become unable to relinquish the permission to speak.

In one embodiment of the present invention, the CD is configured to request the transmission privilege through initiation or activation of a push-to-talk (PTT) key or switch. When a user of a CD in communication system 200 desires to transmit information to other group members, the push-to-talk switch located on the CD is depressed, sending a request (e.g., floor request) to obtain the transmission privilege from communication manager 218. If no other group member is currently assigned the transmission privilege and the communication criteria in effect does not so prohibit or deny the floor, the requesting user is granted (e.g., floor grant) the transmission privilege and is notified by an audible, visual, or tactile alert through the CD. After the requesting user has been granted the transmission privilege, information may then be transmitted from that user to the other group member(s).

In one embodiment of the present invention, each wireless group member establishes a forward link and a reverse link with one or more base stations 216. The former is used to describe a communication channel from a base station 216, while the latter is used to describe a communication channel from a CD to a base station 216. Voice and/or data (as well as other media forms) is converted into data packets using a CD, with the data packets being compatible with the particular data network 214 through which communications to other users take place.

In one embodiment, data network 214 is the Internet. In another embodiment, a dedicated forward channel is established in each communication system (i.e. a terrestrial communication system and a satellite communication system) for broadcasting information from each group member to the other group members. Each group member receives communications from other group members over the common channel.

In yet another embodiment, a dedicated reverse link is established in each communication system for transmitting information to CM 218. Finally, a combination of the above schemes may be used, for instance, establishing a common forward broadcast channel but requiring wireless CDs to transmit information to CM 218 over an individual reverse link assigned to each CD.

When a first group member wishes to transmit information to other members of the group, the first group member requests the transmission privilege by pressing a push-to-talk key on his or her CD, which generates a request (e.g., floor request) formatted for transmission over data network 214. In the case of CDs 202, 204, and 206, the request is transmitted over-the-air to one or more base stations 216. A mobile switching center (MSC) 220 comprises a well-known Inter Working Function (IWF) (not shown) for processing data packets, including the request, between MSC 220 and data network 214. MSC 220 is typically a packet switch, designed to route data packets in accordance with Internet Protocol (IP).

If no other member currently holds the transmission privilege when the transmission privilege request is received by CM 218, CM 218 transmits a message (e.g., floor grant) to the requesting group member, notifying the requesting group member that the transmission privilege has been granted. Audio, visual, or other information from the first group member may then be transmitted to the other group members by sending the information to CM 218, using one of the just-described transmission paths. In one embodiment, CM 218 then provides the information to the group members by duplicating the information and sending each duplicate to the group members. If a single broadcast channel is used, the information need only be duplicated once for each broadcast channel in use. If some but not all group members can listen to the broadcast channel, then the information is duplicated once for those users, and once for each additional user that cannot listen on the broadcast channel. This concept can be extended for the case of multiple broadcast channels.

In an alternative embodiment, CM 218 is incorporated into MSC 220 so that data packets from supporting base stations are routed directly to CM 218 without being routed onto data network 214. In this embodiment, CM 218 is still connected to data network 214 so that other communication systems and devices can participate in a group communication.

CM 218 maintains one or more databases for managing information pertaining to individual group members as well as to each defined net. For example, for each group member, one database may comprise a user name, account number, a telephone number, or dial number, associated with the member's CD, a Mobile Identification Number assigned to the CD, the current member's status in the group, such as whether the member is actively participating the group, a priority code for determining how the transmission privilege is assigned, a data telephone number associated with the CD, an IP address associated with the CD, and an indication of which groups the member is authorized to communicate. Other related types of information may also be stored by the database with respect to each group member.

Interfaces to the system are grouped into functional and physical interfaces. The physical interfaces are not unique to group communication system 200 and consist of an existing wireless air interface, wireless service options, and commercial data networking standards. Higher layer functional interfaces, especially at the application layer, are unique to the group communication service.

Figure 3:
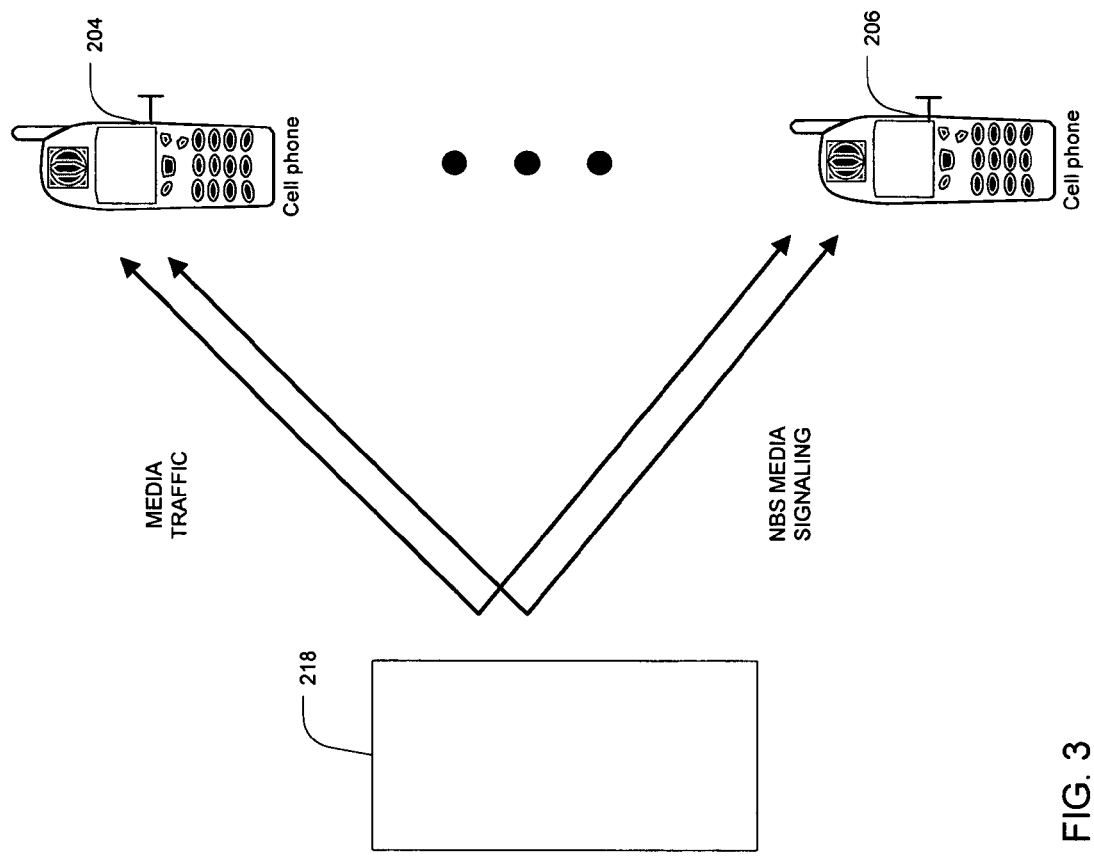
FIG. 3 illustrates a representative implementation of group communication, in accordance with an embodiment of the present invention.
Figure 3:
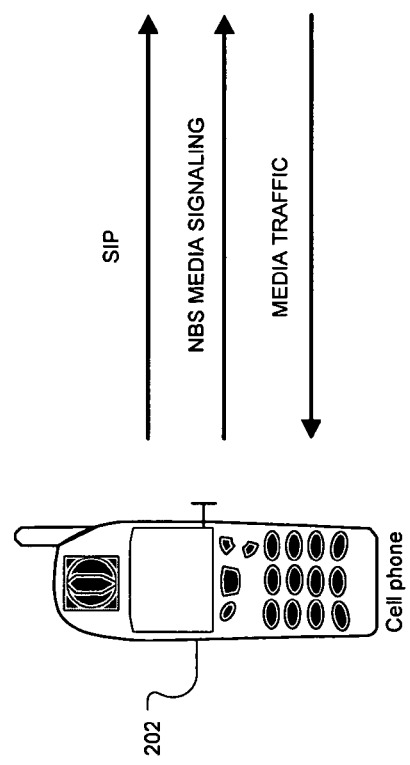

In one implementation of a group communication system, at the application level, a representative embodiment of the present invention operates over three Internet-based protocols as shown in FIG. 3. Of course, other protocols could be used in the alternative. Communications between CM 218, and CDs 202, 204, and 206 occurs within these protocols. CDs may find, join, leave, and learn about various groups using the Session Initiation Protocol (SIP), which is a well-known signaling protocol used in the telecommunications industry. Audio, including voice, video, or data (collectively referred to herein as media), is distributed separately via a third encapsulation. In the example of FIG. 3, CD 202 currently "has the floor", i.e., the transmission privilege, or permission to transmit media to the group. A "floor-control" request is a request for the transmission privilege. While CD 202 holds the transmission privilege, the remaining group members 204, 206, are designated as listeners and correspondingly do not have permission to transmit media to the group. Generally, any CD can send media-signaling or SIP signaling traffic at any time, regardless of whether it holds the transmission privilege.

CM 218 communicates with CDs participating in group communications via transport and group communication application layer protocols. These communications include application signaling (PTT transmission privilege requests, net registration, etc.) as well as the real-time voice media packet streams distributed by CM 218. All real-time media are distributed via dynamic RTP/UDP/IP interfaces on CM 218 and CDs. If CRTP header compression is unavailable, real-time media is encapsulated directly within UDP/IP packets, or datagrams. All real-time signaling occurs via dynamic UDP/IP interfaces on CM 218 and the CDs. Other signaling may take place via a predefined data protocol interface, such as TCP/IP, between CM 218 and the CDs using the well-known Session Initiation Protocol (SIP), an application-level call signaling protocol designed to support Internet telephony. While the present representative embodiment utilizes SIP for signaling, other protocols may also be utilized which provide comparable signaling as are known by those of ordinary skill in the art.

CM 218 may support other management types of interfaces used, for example, to create groups, configure special privileges to the dispatcher and these management type interfaces may also be based on IP signaling techniques. CM 218 may provide an administration interface which is an application level protocol that provides administrative access of a CM user, net, and administration database and associated parameters using Hyper-Text Markup Language (HTML) semantics. Alternatively, language other than HTML may be used. In one embodiment, the interface operates over TCP/IP. A second network interface supporting administrative functions may also exist. This second administrative interface supports the bulk of real-time transfers of administrative information, including membership lists and network status reports, to Java or similar client administrative applications.

A representative group communication system has been described with reference to FIGS. 1-3. To facilitate the formation of an ad-hoc group of users when inclusive to the location-based membership criteria, the group communication system is further configured to cooperatively facilitate the formation of a group based on location of users and manage communication permissions in accordance with principles of availability of limited communication resources such as management of voluminous requests to speak, prioritization of speakers, assistance to disabled speakers, and relinquishment of a user's permission to speak.

There are certain unique security aspects associated with formation of adhoc groups in a cooperative and automatic fashion. Therefore, the authority to initiate formulation of such a group is controlled by strict security procedures. Only authorized personnel are allowed to have access to Dispatcher 226, and to access the control link between Dispatcher 226 and CM 218. CM 218 in turn controls formation of the ad-hoc group of users when inclusive to the location-based membership criteria, hence security aspects of such a formation will be driven solely by secure access to CM 218 functions related to this application by authorized and trained persons only (e.g. Police, Emergency Crews, Fire Dept. personnel, etc.), in addition to the authorized network operator personnel. Aside from the physical security, remote access to critical facilities (e.g. ability to set flags on the paging channel) is conducted by means of cryptographic security keys and authorization certificates in accordance to techniques known to those skilled in the art.

Figure 4:
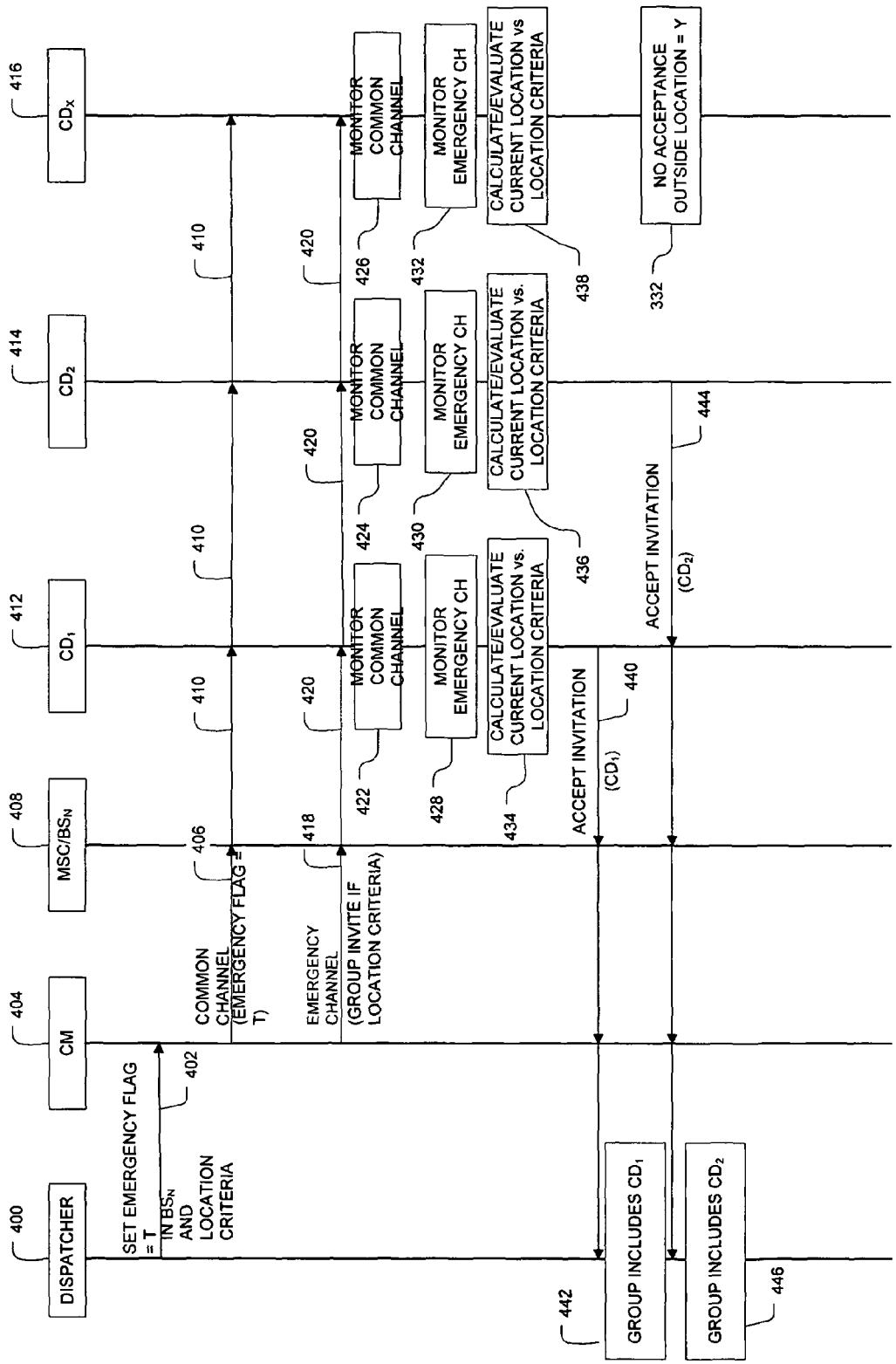
FIG. 4 illustrates the formation of an ad-hoc group formed on the basis of proximity to a designated location, in accordance to an embodiment of the present invention.

FIG. 4 illustrates the formation of an ad-hoc group in response to an emergency notification, wherein the group is formed on the basis of proximity to a designated location. A dispatcher 400 identifies the occurrence or presence of an event or condition wherein communications between proximately located users could be beneficial. Dispatcher 400 requests 402 the setting of an emergency flag in a commonly monitored channel ("common channel") such as a paging or broadcast channel that is regularly monitored by CDs located in the area of interest.

In another embodiment of the present invention, dispatcher 400 also specifies a group membership location criteria such as region or location criteria defining the inclusive boundary of users that are invited to join the group. By way of example and not limitation, representative location criteria may include a location centerpoint and an acceptable radius, perimeter locations, servicing base station identifier, as well as other location based identifiers know by those of ordinary skill in the art.

The request from dispatcher 400 including any location criteria is sent to CM 404 for processing and scheduling in subsequent transmissions. CM 404 directs 406 the MSC/$BS_N$ 408 to transmit a set emergency flag on a common channel in at least an area serviced by a specific base station, designated herein as $BS_N$ 408, that services the area surrounding the desired location of users to be included within the ad-hoc group.

The MSC/$BS_N$ 408 transmits 410 the set emergency flag in a common channel that is regularly monitored by CDs 412, 414, 416, etc. Meanwhile, MSC/$BS_N$ 408 as previously directed 418 by CM 404 transmits 420 a broad or indiscriminant or generalized invitation to join a group to all recipient CDs with their invitation acceptance being conditional upon the CD qualifying according to the location criteria also transmitted in the broad indiscriminant invitation.

CDs 412, 414, 416 monitor 422, 424, 426 the emergency broadcast channel as broadcast by MSC/$BS_N$ 408 and while monitoring the common channel, recipient CDs 412, 414, 416 recognize the set emergency flag and appropriately respond by actively monitoring 428, 430, 432 a designated or known emergency broadcast channel to obtain further information. The CDs 412, 414, 416 receive the broad indiscriminant invitation to join the group with the right to accept the invitation being conditional upon the CD qualifying according to the location criteria also transmitted with the broad indiscriminant invitation in the emergency broadcast channel.

CDs 412, 414, 416 calculate their location and evaluate 434, 436, 438 their location against the group membership location criteria, an example of which includes specified location criteria, to determine qualification for acceptance of the invitation to join the group. By way of example and not limitation, FIG. 4 illustrates $CD_1$ 412 as qualifying to join the group and accordingly accepting 440 the invitation which is relayed back to dispatcher 400 through CM 404. Dispatcher 400 amends 442 the group list to include $CD_1$ 412 as a confirmed member of the group. Similarly, FIG. 4 also illustrates $CD_2$ 414 as qualifying to join the group and accordingly accepting 444 the invitation which is relayed back to dispatcher 400 through CM 404. Dispatcher 400 amends 446 the group list to include $CD_2$ 414 as a confirmed member of the group. Since more CDs may receive the broad indiscriminant invitation than will qualify for inclusion in the group, FIG. 4 illustrates $CD_X$ 416 as failing to qualify to join the group and accordingly forgoing forwarding of any acceptance of the invitation.

Figure 5:
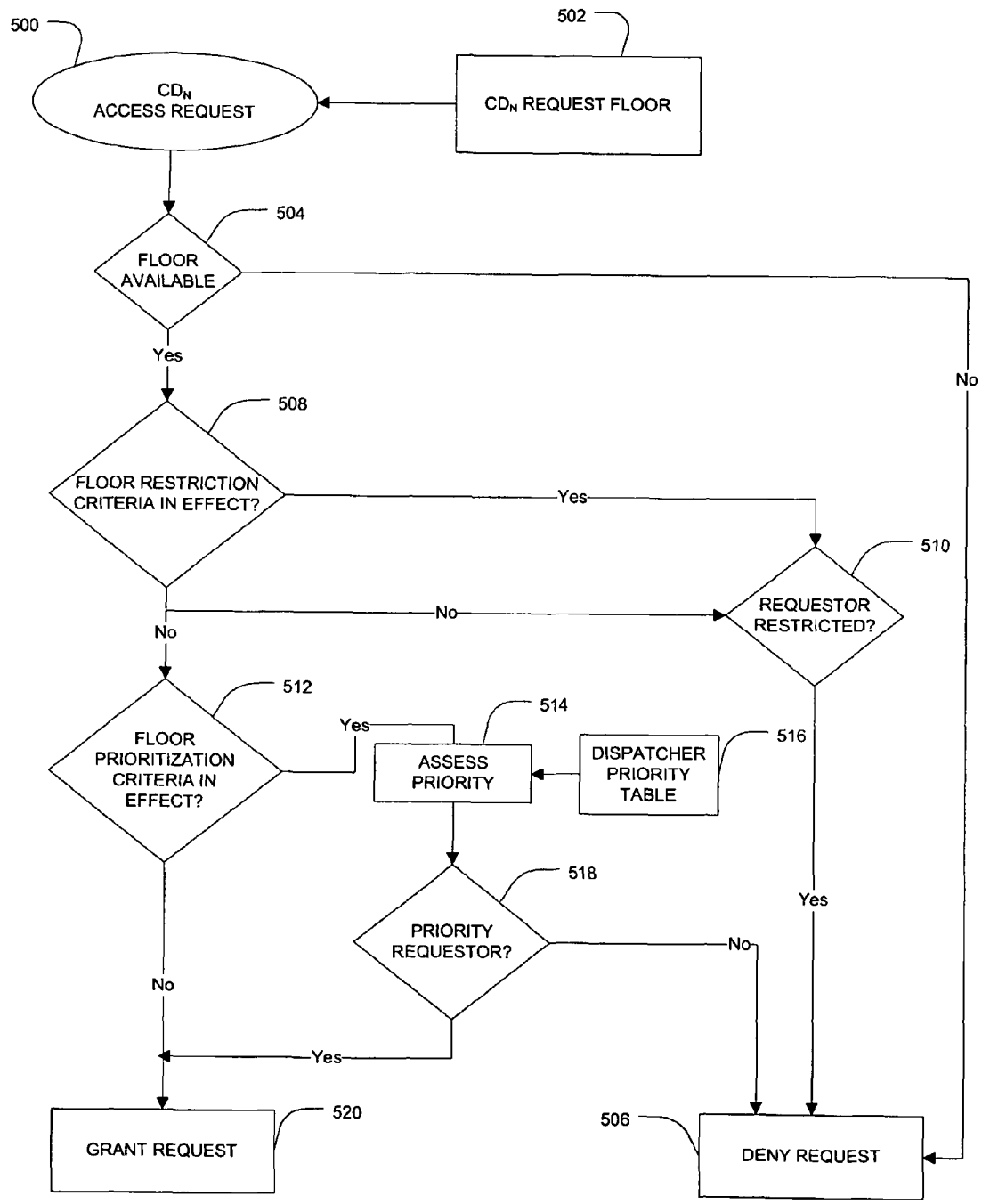
FIG. 5 is a flowchart illustrating representative floor control methodologies, in accordance with one or more embodiments of the present invention.

FIG. 5 is a flowchart illustrating representative floor control methodologies, in accordance with one or more embodiments of the present invention. Group communications during various conditions where resources are limited may benefit from implementation of one or more access control methodologies. FIG. 5 illustrates various access control restrictions that could be enforced upon members of the group in order to provide a more efficient use of available communication resources. Once the ad-hoc group has been formed through the broad indiscriminant invitation process described above, a specific $CD_N$ may request 502 the floor according to a floor request process, such a one describe herein or according to other floor request processes known by those of ordinary skill in the art. A determination 504 identifies the current or scheduled availability of the communication resources and when the floor is unavailable, the floor request by $CD_N$ is denied 506.

When determination 504 identifies the availability of the floor, a determination 508 identifies floor restriction criteria that may be in effect and when floor restriction criteria are in effect, then a determination 510 identifies if $CD_N$ is restricted. If $CD_N$ is restricted, then the floor request by $CD_N$ is denied 506. If $CD_N$ is not restricted or if floor restrictions are not in effect, then a determination 512 identifies if floor prioritization criteria is in effect and grants 520 the floor request when floor prioritization is not in effect. When floor prioritization criteria is in effect, then a priority of $CD_N$ is assessed 514 using a dispatcher priority table 516 to determine if the access request by $CD_N$ is a priority. A determination 518 identifies any prioritization and either the floor request by $CD_N$ is denied 506 if $CD_N$ is of lesser priority or granted 520 if $CD_N$ is of greater priority.

Figure 6:
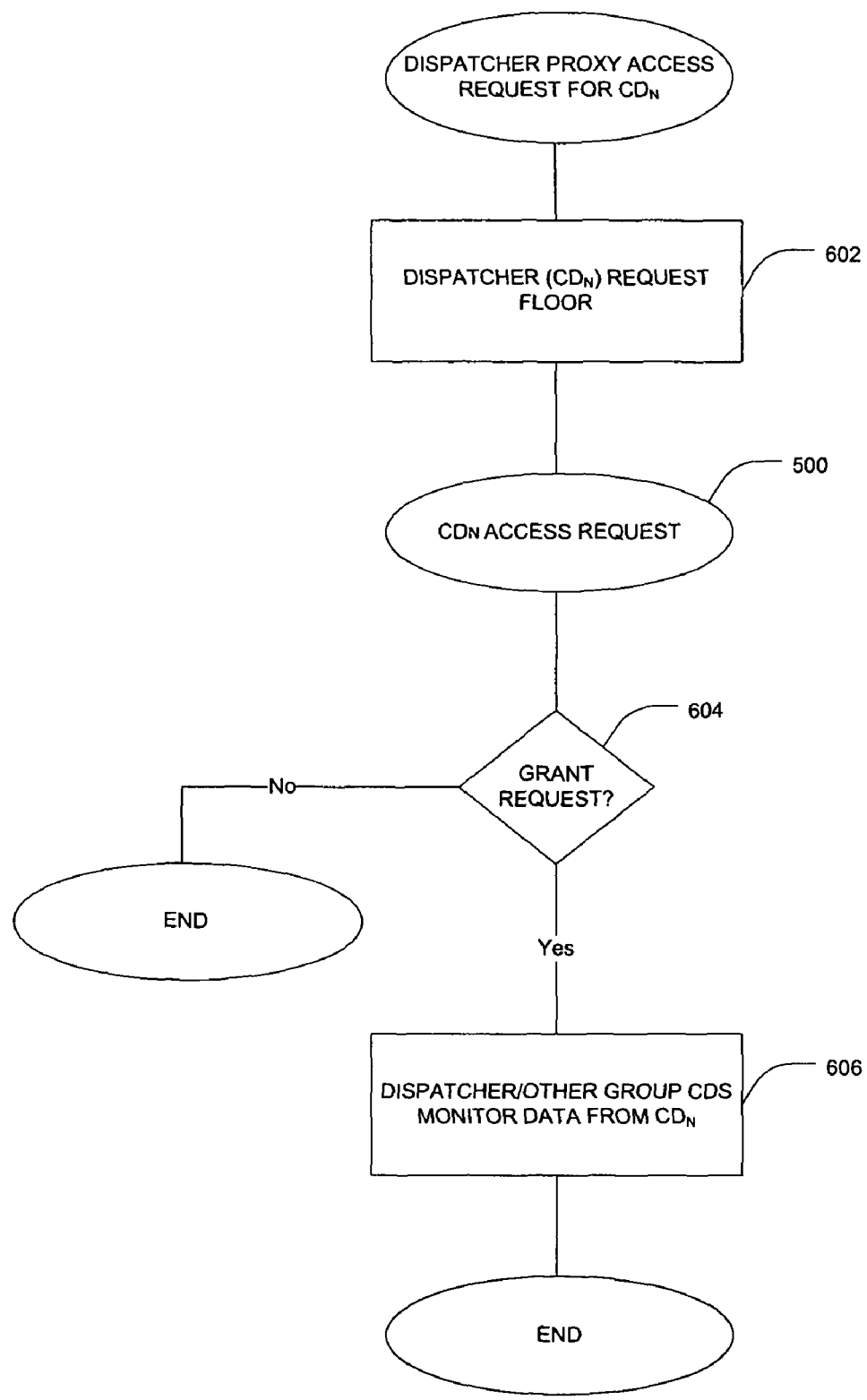
FIG. 6 is a flowchart illustrating remote floor request and grant to a member of the group, in accordance with an embodiment of the present invention.

FIG. 6 is a flowchart illustrating the ability of remotely requesting and granting the floor to a member of the group. Various conditions may occur which prohibit a user of a CD from communicating in the group. A representative condition may include the disability of the user or inability of the user to engage in the physical steps (e.g., activating the PTT button on a CD) necessary for requesting the floor. Whether such disabilities are preexisting to a disaster occurrence or exacerbated by an occurrence, the present embodiment of the invention facilitates communication between a dispatcher and a user of a CD.

In the present embodiment of the invention, a dispatcher acts as a proxy to $CD_N$ by requesting 602 the floor according to a floor request process, such a one describe herein or according to other floor request processes known by those of ordinary skill in the art. In response to the dispatcher or proxy floor request, processing of the request may proceed according to the $CD_N$ access request process 500 of FIG. 5. Alternatively, an access request may be issued in proxy by the dispatcher for CDs that are not affected by any floor restriction or floor prioritization criteria thereby more expeditiously resulting in the granting of the floor or $CD_N$.

A determination 604 identifies a resulting grant of the floor whereupon the dispatcher or other group members monitor 606 communication from $CD_N$. The resulting monitoring may allow a disabled user to make voice requests for emergency services or may allow monitoring of situational or conditional data.

Figure 7:
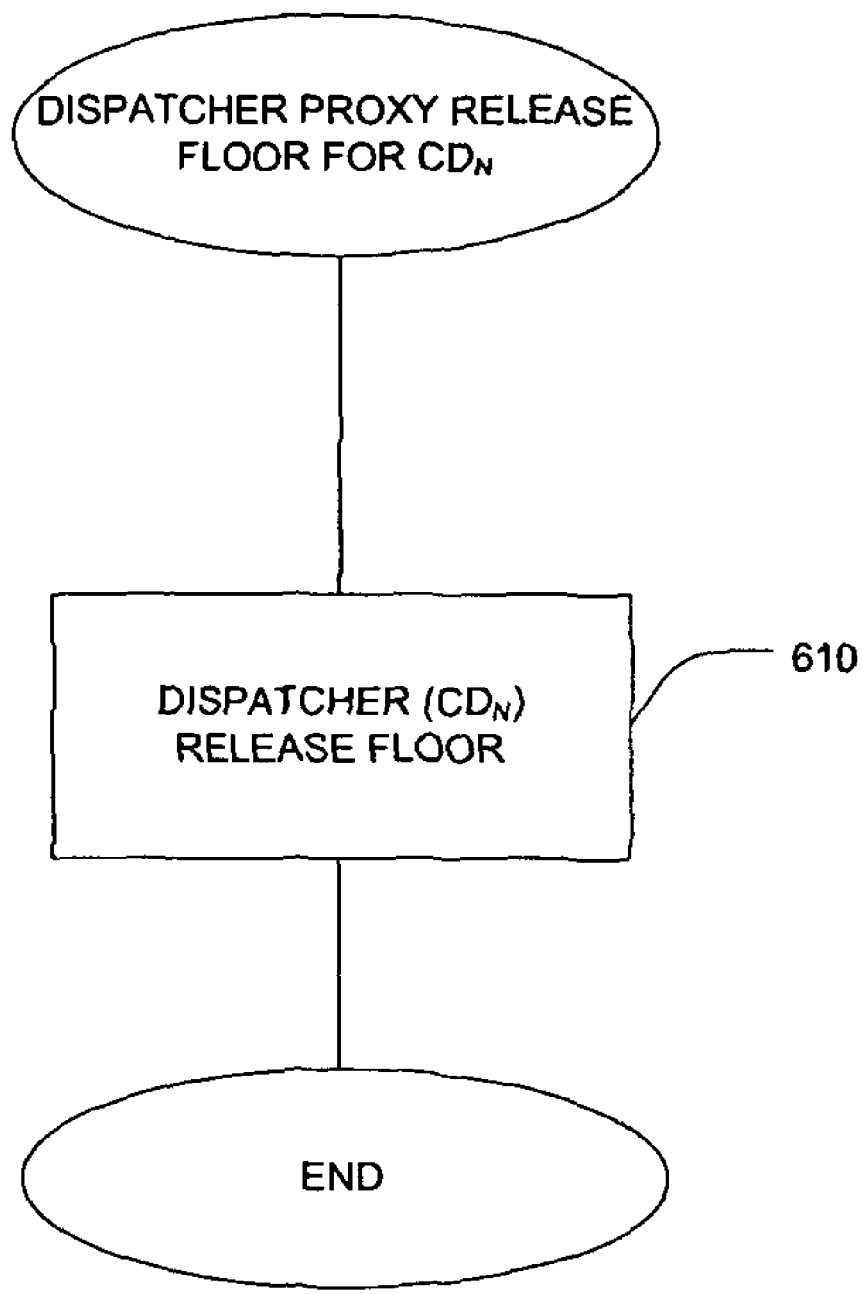
FIG. 7 is a flowchart illustrating remote release of the floor in a communication group, in accordance with an embodiment of the present invention.

FIG. 7 illustrates a flowchart for yet another embodiment of the present invention. When the floor is granted to a specific $CD_N$, that $CD_N$ retains the floor until the floor is released by the user. In an emergency situation or a disastrous occurrence, a $CD_N$ may be in possession of the floor and due to an emergency or catastrophic conditions, may be unable to relinquish or release the floor for other users or the dispatcher may determine that the communication resources are immediately needed by another user. Accordingly, the present embodiment of the invention enables a dispatcher to release 610 the floor that is held by a specific $CD_N$ thereby allowing utilization of the communication resources by other members of the group.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium.

In the alternative, the storage medium may be integral to the processor. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communicating among a communication group of a plurality of wireless communication devices in a communication system, the method comprising:
    transmitting an invitation to join the communication group to the plurality of wireless communication devices, the invitation including group membership location criteria;
    receiving an acceptance to the invitation from at least one of the plurality of wireless communication devices based on a determination by the at least one of the plurality of wireless communication devices that a location of the at least one of the plurality of wireless communication devices meets the group membership location criteria;
    forming the communication group comprised of ones of the plurality of wireless communication devices that meet the group membership location criteria; and
    granting to one of the plurality of wireless communication devices of the communication group permission to transmit to others of the plurality of wireless communication devices of the communication group.

2. The method of claim 1, wherein receiving the acceptance to the invitation from at least one of the plurality of wireless communication devices further comprises receiving an acceptance of the invitation to join the communication group from each of the plurality of wireless communication devices that meet the group membership location criteria.

3. The method of claim 1, further comprising broadcasting a flag in a first common channel directing the plurality of wireless communication devices to monitor a second common channel.

4. The method of claim 3, wherein the first common channel is a paging channel.

5. The method of claim 3, wherein the second common channel is an emergency common channel.

6. The method of claim 1, wherein receiving the acceptance to the invitation is based on an evaluation, at the plurality of wireless communication devices, of evaluating the group membership location criteria including comparing a present location of each of the plurality of wireless communication devices receiving the invitation with the group membership location criteria to determine ones of the plurality of wireless communication devices that are inclusive of the group membership location criteria.

7. The method of claim 1, wherein the granting to one of the plurality of wireless communication devices of the communication group permission to transmit further comprises determining availability of communication resources to grant in the communication system and when the communication resources are available, granting access to the communication resources to the one of the plurality of wireless communication devices of the communication group.

8. The method of claim 1, wherein the granting to one of the plurality of wireless communication devices of the communication group permission to transmit further comprises denying grant of access to communication resources of the one of the plurality of wireless communication devices when floor restriction criteria restrict access of the one of the plurality of wireless communication devices to communication resources.

9. The method of claim 1, wherein the granting to one of the plurality of wireless communication devices of the communication group permission to transmit further comprises prioritizing grant of access to communication resources of the one of the plurality of wireless communication devices when prioritization criteria prioritizes access of the one of the plurality of wireless communication devices to communication resources.

10. The method of claim 1, further comprising receiving instructions from a dispatcher for permission for the one of the plurality of wireless communication devices to transmit to others of the plurality of wireless communication devices; and
    wherein the granting to one of the plurality of wireless communication devices of the communication group permission to transmit includes granting permission based on the received instructions from the dispatcher.

11. The method of claim 1, further comprising releasing the permission of the one of the plurality of wireless communication devices to transmit to others of the plurality of wireless communication devices of the communication group based on instructions received from a dispatcher.

12. In a wireless communication device, a method of communicating in a communication group of a plurality of wireless communication devices in a communication system, the method comprising:
    receiving an invitation to join the communication group, the invitation including group membership location criteria;
    evaluating the group membership location criteria to determine whether a location of the wireless communication device meets the group membership location criteria;
    joining the communication group based on determining that the location of the wireless communication device meets the group membership location criteria; and
    transmitting to other ones of the plurality of wireless communication devices of the communication group upon receipt of permission to transmit in the communication system to others of the plurality of wireless communication devices of the communication group.

13. The method of claim 12, wherein the joining the communication group further comprises accepting the invitation to join the communication group when the wireless communication device meets the group membership location criteria.

14. The method of claim 12, further comprising monitoring a first common channel for a flag directing the wireless communication device to monitor a second common channel including the invitation.

15. The method of claim 14, wherein the first common channel is a paging channel.

16. The method of claim 14, wherein the second common channel is an emergency common channel.

17. The method of claim 12, wherein evaluating the group membership location criteria comprises comparing a present location of the wireless communication device with the group membership location criteria to determine whether the wireless communication device is inclusive of the group membership location criteria.

18. A wireless communication system, comprising:
    a communication manager including a dispatcher interface configured to generate an invitation to join a communication group, the invitation including group membership location criteria, the communication manager further configured to grant to one of the communication group permission to transmit to others of the communication group; and a base station configured to transmit the invitation to join the communication group to a plurality of wireless communication devices and to receive an acceptance to the invitation from at least one of the plurality of wireless communication devices based on a determination by the at least one of the plurality of wireless communication devices that a location of the at least one of the plurality of wireless communication devices meets the group membership location criteria.

19. The wireless communication system of claim 18, wherein the communication manager and the base station are further configured to broadcast a flag in a first common channel directing the plurality of wireless communication devices to monitor a second common channel including the invitation.

20. The wireless communication system of claim 19, wherein the first common channel is a paging channel.

21. The wireless communication system of claim 19, wherein the second common channel is an emergency common channel.

22. The wireless communication system of claim 18, wherein the base station is further configured to receive an acceptance of the invitation from each of the plurality of wireless communication devices that compare a respective present location with the group membership location criteria to determine that each of the plurality of wireless communication devices are inclusive of the group membership location criteria.

23. The wireless communication system of claim 18, wherein the communication manager is further configured to determine availability of communication resources to grant in the communication system and when the communication resources are available to grant access to the communication resources to the one of the plurality of wireless communication devices of the communication group.

24. The wireless communication system of claim 18, wherein the communication manager is further configured to deny grant of access to communication resources of the one of the plurality of wireless communication devices when floor restriction criteria restrict access of the one of the plurality of wireless communication devices to communication resources.

25. The wireless communication system of claim 18, wherein the communication manager is further configured to prioritize grant of access to communication resources of the one of the plurality of wireless communication devices when prioritization criteria prioritizes access of the one of the plurality of wireless communication devices to communication resources.

26. The wireless communication system of claim 18, wherein the communication manager is further configured to grant to one of the plurality of wireless communication devices of the communication group permission to transmit when instructed by a dispatcher.

27. The wireless communication system of claim 18, wherein the communication manager is further configured to release the permission of the one of the plurality of wireless communication devices to transmit to others of the plurality of wireless communication devices of the communication group based on instructions from a dispatcher.

28. A communication device for communicating in a communication group of a plurality of wireless communication devices, the communication device comprising:

means for receiving an invitation to join the communication group, the invitation including group membership location criteria;

means for evaluating the group membership location criteria to determine whether a location of the communication device meets the group membership location criteria;

means for joining the communication group when the means for evaluating has determined that the location of the communication device meets the group membership location criteria; and means for transmitting to other ones of the plurality of wireless communication devices of the communication group upon receipt of permission to transmit in a communication system to others of the plurality of wireless communication devices of the communication group.

29. The communication device of claim 28, wherein the means for joining the communication group further comprises means for accepting the invitation to join the communication group when the communication device meets the group membership location criteria.

30. The communication device of claim 28, further comprising means for monitoring a first common channel for a flag directing the wireless communication device to monitor a second common channel including the invitation.

31. The communication device of claim 30, wherein the first common channel is a paging channel.

32. The communication device of claim 30, wherein the second common channel is an emergency common channel.

33. The communication device of claim 28, wherein the means for evaluating the group membership location criteria comprises means for comparing a present location of the wireless communication device with the group membership location criteria to determine whether the wireless communication device is inclusive of the group membership location criteria.

34. A network device for communicating among a communication group of a plurality of wireless communication devices in a communication system, the network device comprising:

means for transmitting an invitation to join the communication group to the plurality of wireless communication devices, the invitation including group membership location criteria;

means for receiving an acceptance to the invitation from at least one of the plurality of wireless communication devices based on a determination by the at least one of the plurality of wireless communication devices that a location of the at least one of the plurality of wireless communication devices meets the group membership location criteria;

means for forming the communication group comprised of ones of the plurality of wireless communication devices that meet the group membership location criteria; and means for granting to one of the plurality of wireless communication devices of the communication group permission to transmit to others of the plurality of wireless communication devices of the communication group.

35. A communication device for communicating in a communication group of a plurality of wireless communication devices, the communication device comprising:

a receiver to receive an invitation to join the communication group the invitation including group membership location criteria;

an evaluation component to evaluate the group membership location criteria to determine whether a location of the communication device meets the group membership location criteria;

a joining component to join the communication group when the evaluation component has determined that the location of the communication device meets the group membership location criteria; and a transmitter to transmit to other ones of the plurality of wireless communication devices of the communication group upon receipt of permission to transmit in a communication system to others of the plurality of wireless communication devices of the communication group.

36. The communication device of claim 35, wherein the evaluation component is configured to generate and initiate transmission of an acceptance of the invitation to join the communication group when the communication device meets the group membership location criteria.

37. The communication device of claim 35, further comprising a monitor component for monitoring a first common channel for a flag directing the wireless communication device to monitor a second common channel including the invitation.

38. The communication device of claim 37, wherein the first common channel is a paging channel.

39. The communication device of claim 37, wherein the second common channel is an emergency common channel.

40. The communication device of claim 35, wherein the evaluation component is configured to compare a present location of the wireless communication device with the group membership location criteria to determine if the wireless communication device is inclusive of the group membership location criteria.

41. A tangible computer readable medium containing instructions for communicating among a communication group of a plurality of wireless communication devices in a communication system, the instructions executable by a processor to cause the processor to:

transmit an invitation to join the communication group to the plurality of wireless communication devices, the invitation including group membership location criteria;

receive an acceptance to the invitation from at least one of the plurality of wireless communication devices based on a determination by the at least one of the plurality of wireless communication devices that a location of the at least one of the plurality of wireless communication devices meets the group membership location criteria;

form the communication group comprised of ones of the plurality of wireless communication devices that meet the group membership location criteria; and grant to one of the plurality of wireless communication devices of the communication group permission to transmit to others of the plurality of wireless communication devices of the communication group.

42. The tangible computer readable medium of claim 41, wherein receiving the acceptance to the invitation from at least one of the plurality of wireless communication devices further comprises receiving an acceptance of the invitation to join the communication group from each of the plurality of wireless communication devices that meets the group membership location criteria.

43. The tangible computer readable medium of claim 41, wherein the instructions are further executable by the processor to cause the processor to broadcast a flag in a first common channel directing the plurality of wireless communication devices to monitor a second common channel.

44. The tangible computer readable medium of claim 43, wherein the first common channel is a paging channel.

45. The tangible computer readable medium of claim 43, wherein the second common channel is an emergency common channel.

46. The tangible computer readable medium of claim 41, wherein the processor compares a present location of each of the plurality of wireless communication devices receiving the invitation with the group membership location criteria to determine ones of the plurality of wireless communication devices that satisfy the group membership location criteria.

47. The tangible computer readable medium of claim 41, wherein the granting to one of the plurality of wireless communication devices of the communication group permission to transmit further comprises determining availability of communication resources to grant in the communication system and when the communication resources are available, granting access to the communication resources to the one of the plurality of wireless communication devices of the communication group.

48. The tangible computer readable medium of claim 41, wherein the granting to one of the plurality of wireless communication devices of the communication group permission to transmit further comprises denying grant of access to communication resources of the one of the plurality of wireless communication devices when floor restriction criteria restrict access of the one of the plurality of wireless communication devices to communication resources.

49. The tangible computer readable medium of claim 41, wherein the granting to one of the plurality of wireless communication devices of the communication group permission to transmit further comprises prioritizing grant of access to communication resources of the one of the plurality of wireless communication devices when prioritization criteria prioritizes access of the one of the plurality of wireless communication devices to communication resources.

50. The tangible computer readable medium of claim 41, wherein the instructions are further executable by the processor to cause the processor to receive instructions from a dispatcher for permission for the one of the plurality of wireless communication devices to transmit to others of the plurality of wireless communication devices, wherein the granting to one of the plurality of wireless communication devices of the communication group permission to transmit includes granting permission based on the received instructions from the dispatcher.

51. The tangible computer readable medium of claim 41, wherein the instructions are further executable by the processor to cause the processor to release the permission of the one of the plurality of wireless communication devices to transmit to others of the plurality of wireless communication devices of the communication group based on instructions received from a dispatcher.

52. A tangible computer readable medium containing instructions for communicating in a communication group of a plurality of wireless communication devices in a communication system, the instructions executable by a processor of a wireless communication device to cause the processor to:

receive an invitation to join the communication group, the invitation including group membership location criteria;

evaluate the group membership location criteria to determine whether a location of the wireless communication device meets the group membership location criteria;

join the communication group based on determining that the location of the wireless communication device meets the group membership location criteria; and transmit to at least one of the plurality of wireless communication devices of the communication group upon receipt of permission to transmit in the communication system to others of the plurality of wireless communication devices of the communication group.

53. The tangible computer readable medium of claim 52, wherein the joining the communication group further comprises accepting the invitation to join the communication group when the wireless communication device meets the group membership location criteria.

54. The tangible computer readable medium of claim 52, wherein the instructions are further executable by the processor to cause the processor to monitor a first common channel for a flag directing the wireless communication device to monitor a second common channel.

55. The tangible computer readable medium of claim 54, wherein the first common channel is a paging channel.

56. The tangible computer readable medium of claim 54, wherein the second common channel is an emergency common channel.

57. The tangible computer readable medium of claim 52, wherein evaluating the group membership location criteria comprises comparing a present location of the wireless communication device with the group membership location criteria to determine whether the wireless communication device satisfies the group membership location criteria.

* * * * *